United States Patent
Fernandez Diaz et al.

(10) Patent No.: US 12,448,949 B2
(45) Date of Patent: Oct. 21, 2025

(54) PREDICTING GRID FREQUENCY

(71) Applicant: Siemens Gamesa Renewable Energy Innovation & Technology S.L., Sarriguren (DK)

(72) Inventors: Juan Fernandez Diaz, Zizur Mayor (ES); Manuel Garcia Plaza, Alcala de Henares (ES); Fernando Roque Martinez Mendoza, Burlada (ES); Maciej Marek Niegowski, Olloki (ES); Venkata Swaroop Pappala, Hamburg (DE); Sebastian Trujillo, Hamburg (DE); Sergey Yashchenko, Hamburg (DE)

(73) Assignee: Siemens Gamesa Renewable Energy Innovation & Technology S.L., Sarriguren (DK)

( * ) Notice: Subject to any disclaimer, the term of this patent is extended or adjusted under 35 U.S.C. 154(b) by 0 days.

(21) Appl. No.: 18/681,899

(22) PCT Filed: Aug. 9, 2022

(86) PCT No.: PCT/EP2022/072315
§ 371 (c)(1),
(2) Date: Feb. 7, 2024

(87) PCT Pub. No.: WO2023/002558
PCT Pub. Date: Mar. 2, 2023

(65) Prior Publication Data
US 2024/0318632 A1  Sep. 26, 2024

(30) Foreign Application Priority Data
Aug. 23, 2021  (EP) .................................... 21382776

(51) Int. Cl.
*F03D 7/04* (2006.01)
*F03D 7/02* (2006.01)
*G01R 19/25* (2006.01)

(52) U.S. Cl.
CPC ........... *F03D 7/048* (2013.01); *F03D 7/0284* (2013.01); *G01R 19/2513* (2013.01);
(Continued)

(58) Field of Classification Search
CPC ........ F03D 7/048; F03D 7/0284; F03D 7/046; G01R 19/2513; F05D 2270/1033;
(Continued)

(56) References Cited

U.S. PATENT DOCUMENTS

| | | | | |
|---|---|---|---|---|
| 2013/0277970 | A1* | 10/2013 | Dange | F03D 7/0276 290/44 |
| 2017/0179720 | A1* | 6/2017 | Porter | H02J 3/16 |
| 2020/0063710 | A1* | 2/2020 | Farrokhabadi | F03D 17/00 |
| 2020/0192304 | A1* | 6/2020 | Hentschel | G06N 3/045 |
| 2020/0210824 | A1* | 7/2020 | Poornaki | G05B 23/0221 |

FOREIGN PATENT DOCUMENTS

| | | |
|---|---|---|
| CN | 109 787 236 A | 5/2019 |
| CN | 108 123 438 B | 12/2019 |

(Continued)

OTHER PUBLICATIONS

Kaur et al., "Power Grid Frequency Prediction Using ANN Considering the Stochasticity of Wind Power" 2013 (Year: 2013).*
(Continued)

*Primary Examiner* — Courtney D Heinle
*Assistant Examiner* — Ryan C Clark
(74) *Attorney, Agent, or Firm* — Schmeiser, Olsen & Watts, LLP

(57) ABSTRACT

A method of predicting a frequency value of a utility grid to which a wind park is connected is provided, the method including: obtaining plural utility grid measurement values pertaining to a predetermined time range before and until a
(Continued)

present point in time; obtaining plural wind park measurement values pertaining to the time range; feeding the plural utility grid measurement values and the plural wind park measurement values into a recurrent neural network trained to output the frequency value at at least one next point in time, the next point in time being in particular between 0.5 s and 2 s after the present point in time.

14 Claims, 2 Drawing Sheets

(52) U.S. Cl.
CPC . *F05B 2270/1033* (2013.01); *F05B 2270/337* (2013.01); *F05B 2270/709* (2013.01)
(58) Field of Classification Search
CPC .......... F05D 2270/337; F05D 2270/709; F05D 2270/342
See application file for complete search history.

(56) References Cited

FOREIGN PATENT DOCUMENTS

| EP | 3741991 A1 * | 11/2020 | ............. F03D 7/028 |
| WO | WO-2014181367 A1 * | 11/2014 | ............ F03D 7/0276 |
| WO | WO-2018177520 A1 * | 10/2018 | ............. G05B 15/02 |
| WO | WO-2020079000 A1 * | 4/2020 | ............ F03D 7/0284 |
| WO | WO-2020094393 A1 * | 5/2020 | ............. F03D 17/00 |

OTHER PUBLICATIONS

International Search Report & Written Opinion for PCT/EP2022/072315 mailed on Nov. 14, 2022.
Kaur Simarjit et al: "Power Grid Frequency Prediction Using ANN Considering the Stochasticity of Wind Power", 2013 5th International Conference on Computational Intelligence and Communication Networks, IEEE, Sep. 27, 2013 (Sep. 27, 2013), pp. 311-315.

* cited by examiner

PREDICTING GRID FREQUENCY

CROSS-REFERENCE TO RELATED APPLICATIONS

This application claims priority to PCT Application No. PCT/EP2022/072315, having a filing date of Aug. 9, 2022, which claims priority to EP application Ser. No. 21/382,776.9, having a filing date of Aug. 23, 2021, the entire contents both of which are hereby incorporated by reference.

FIELD OF TECHNOLOGY

The following relates to a method and to a corresponding arrangement of predicting a frequency value of a utility grid to which a wind park is connected. Furthermore, the following relates to a wind park comprising the arrangement.

BACKGROUND

A wind park comprising plural wind turbines is conventionally connected to a utility grid which provides electric energy to plural consumers. Nominally, the grid frequency, i.e., the electrical frequency of the AC power or the AC voltage of the utility grid, is at a nominal value, for example 50 Hz or 60 Hz. Depending on the power supplied by power production facilities, like the wind parks, and power drawn by plural consumers from the utility grid, the electrical grid frequency may change.

However, stability of the electrical grid frequency may be quite essential in maintaining power supply quality and security. Wind parks depend on sufficient wind speed in order to supply a sufficient amount of electrical power to the utility grid. The load behaviour or the fluctuations in the feed-in power (due to changing wind conditions) contributed by high penetration of renewable generation, may endanger frequency stability. To address this issue, transmission system operators (TSO) may conventionally maintain a certain amount of balancing power (reserve) that can be switched on or off as required. Apart from this, the TSO may specify (for example by a grid code) how the individual generators including the wind turbines connected to the grid should support the grid during a frequency event, such as an underfrequency event or an overfrequency event.

In order to provide utility grid frequency monitoring and in particular enabling to initiate measures to keep the grid frequency around a nominal level, prediction methods may have been applied conventionally. Traditionally, statistical methods such as polynomial regression, autoregressive moving average and autoregressive integrated moving average may have been used for prediction of univariate time series. In the publication by S. Kaur, S. Agrawal and Y. P. Verma, "Power Grid Frequency Prediction Using ANN Considering the Stochasticity of Wind Power," 2013 5th International Conference and Computational Intelligence and Communication Networks, 2013, pp. 311-315, doi: 10.1109/CICN.2013.71, simple artificial neural network models were used for frequency predictions in the wind power domain. The authors considered the data with one-hour granularity and the neural network model performance was found to be superior over the traditional statistical methods.

However, the conventional methods do not in all circumstances provide accurate and reliable predictions of frequencies of the utility grid. Thus, there may be a need for a method and a corresponding arrangement of predicting a frequency value of a utility grid, wherein accuracy and/or reliability is improved and wherein complexity is reduced.

SUMMARY

An aspect relates to a method of predicting a frequency value of a utility grid to which a wind park is connected, the method comprising obtaining plural utility grid measurement values pertaining to a predetermined time range before and until a present point in time: obtaining plural wind park measurement values (for example active power and/or reactive power and/or voltage) pertaining to the time range: feeding the plural utility grid measurement values and the plural wind park measurement values into a recurrent neural network trained to output the frequency value at at least one next point in time, the next point in time being in particular between 0.5 s and 2 s after the present point in time.

In embodiments, the method may for example be performed by a module of a wind park controller or a park pilot. In other embodiments, the method may be performed by a utility grid operator. In embodiments, the method may be implemented in software and/or hardware. In embodiments, the method may be performed during power production by the wind park. The wind park may comprise plural wind turbines which are connected at a point of common coupling, wherein the output power of the individual wind turbines may be supplied to the point of common coupling. The wind turbines may be connected via respective wind turbine transformers to the point of common coupling. The point of common coupling may be connected via one or more wind park transformers to the utility grid. The utility grid may be associated with a nominal frequency, for example 50 Hz or 60 Hz representing the electrical frequency of the AC voltage and/or AC current and/or AC power.

The utility grid measurement values may pertain to one or more electrical parameters of the utility grid, in particular frequency and/or voltage. For each of the electrical parameters of the grid, plural values may be provided pertaining or relating to the predetermined time range, for example comprising sample measurement values across the predetermined time range. The time range covers points in time in the past up to the present point in time.

The plural wind park measurement values may comprise plural wind park power measurement values. The plural wind park measurement values may e.g., represent values of one or more electrical parameters of one or more wind turbines or the entire wind park, in particular electrical power output parameter values. The plural wind park measurement values in particular may represent values of one or more electrical parameters of only one wind turbine comprising only one generator or one or more electrical parameters of a single wind farm.

It was found by the inventors that it is possible to predict grid frequency with high accuracy using data from one single generator or a single wind farm connected to the grid. This was not done conventionally.

Each of the wind park parameters may comprise measurement values covering the time range, i.e., pertaining to different points in time within the time range.

The more utility grid measurement values and the more wind park measurement values are utilized, the higher the accuracy of the prediction of the frequency value may be. The wind park power parameters may influence the frequency value of the utility grid. Thus, the accuracy of the method may be improved by including as input data the wind park measurement values. Furthermore, also the utility grid parameters and respective measurement values thereof may have a predictive value for the frequency value of the utility grid at the next point in time. According to embodiments of the present invention, other input values are utilized for improving the prediction.

In embodiments, the method employs a recurrent neural network which is appropriately trained. A recurrent neural network is a class of artificial neural networks where connections between nodes form a directed graph along a temporal sequence. Thereby, the recurrent neural network allows to model a temporal dynamic behaviour. The recurrent neural network may receive for each of the utility grid parameters, a (time) sequence of inputs, corresponding to the measurement values across the predetermined time range. Furthermore, the recurrent neural network may also receive for each of the wind park parameters respective measurement values presenting a sequence of inputs, e.g., representing a time series of respective measurement values across the predetermined time range.

The term "recurrent neural network" refers to two broad classes of networks with a similar general structure, where one is finite impulse, and the other is infinite impulse. A finite impulse recurrent network is a directed acyclic graph that can be unrolled and replaced with a strictly feedforward neural network, while an infinite impulse recurrent network is a directed cyclic graph that cannot be unrolled. The recurrent neural network may for example comprise an input layer which receives the measurement values of the utility grid parameters and the measurement values of the wind park power parameters. The network may further comprise one or more intermediate layers, for example two or more LSTM layers. Furthermore, the network may comprise a fully connected layer representing an output layer for example.

The recurrent neural network (RNN) is different from a simple artificial neural network model as used in the reference as cited above, due to the following reasons: The RNN may work on the principle of saving the output of a layer and feeding this back to the input in order to predict the output of the layer. RNN may consider the current input and the previously received inputs and may memorize previous inputs due to its internal memory. As a result, RNN may implicitly take time dependence of time series into account and may improve results of predictions.

The next point in time may be a point in time in the future and thus may be different from any point in time for which measurement values of the utility grid parameter and the wind park power parameter(s) have been utilized. In embodiments, the method may allow a precise and accurate forecast of the utility grid frequency. Precise forecast of the grid frequency may assist the (i) TSO to optimize the amount of required balance (reserve) power, (ii) power plant operators to optimize the power flow to/from the energy storage in a hybrid power plant and (iii) with predictive control, power plants including wind farms can provide faster frequency response.

The frequency event in a utility grid may be defined as a transition from the normal-frequency state when the frequency is in the normal range to the frequency-deviation state, when the frequency is below or above the normal frequency limits. Embodiments of the present invention may allow frequency and frequency deviation event predictions in a time interval from one to few seconds using historical grid frequency and wind park data.

According to an embodiment of the present invention, the plural utility grid measurement values contain a, across the time range, time series of values of at least one of the grid frequencies as measured at one or more locations: a grid voltage as measured at one or more locations, in particular measured at a wind park grid connection node.

The time series of the values may correspond to measurement values of plural subsequent points in time before and up to the present point in time. The grid frequency may be measured at one or more locations within the utility grid, for example may be measured at a connection node where the wind park is connected to the utility grid. The grid frequency may be measured at a primary side or a secondary side of a wind farm transformer, for example. The grid frequency may be measured for example by a grid measurement station. The grid voltage may also be measured at one or more locations, for example at a connection node where the utility grid is connected to the wind park, for example at a primary side of a wind farm transformer (the grid voltage may then be derived from the transformation ratio of the transformer) or a secondary side of the wind park transformer. Thereby, reliable measurement values may be obtained. Considering the grid frequency at plural points in time before and up to a present point in time may enable to accurately predict the frequency value of the utility grid at a next point in time. The same may hold for the grid voltage. In further embodiments, further parameters characterizing the utility grid may also be included or additionally be included as input values for the recurrent neural network.

Prediction of an accurate grid frequency may enable to initiate countermeasures or procedures, in order to counteract potential deviations from the nominal grid frequency.

According to an embodiment of the present invention, the plural wind park measurement values contain a, across the time range, time series of values of at least one of an active output power of the wind park: a reactive output power of the wind park.

The electrical power fed from the wind park to the utility grid may also influence the frequency of the utility grid at the next point in time. Thus, the prediction may be improved by also considering the wind park measurement values including for example active output power and/or reactive output power of the wind park. Thereby, the prediction accuracy may be improved.

According to an embodiment of the present invention, the method further comprises classifying the frequency value output from the recurrent neural network as at least one of a normal frequency value, if the frequency value is within a predetermined frequency range: an underfrequency value, if the frequency value is below the predetermined frequency range or below a low frequency threshold value: an overfrequency value, if the frequency value is above the predetermined frequency range or above a high frequency threshold value.

Classifying the frequency value which has been derived by the recurrent neural network may utilize at least two thresholds, in particular a low frequency threshold value and a high frequency threshold value. Thereby, a qualitative output value representing the frequency of the utility grid is provided, simplifying the interpretation of the result. The predetermined frequency range may for example be the range between the low frequency threshold value and the high frequency threshold value.

According to an embodiment of the present invention, the time range amounts to between 30 s and 200 s, and/or wherein a number of measurement values across the time range is between 30 and 200, and/or wherein a time step is between 0.5 s and 2 s. Other values for the time range, the number of measurement values and the time step are possible. If the time range is relatively restricted, the amount of data needed to be processed may be restricted. The same may hold for the number of measurement values.

According to an embodiment of the present invention, the method is continuously performed by implementing the predetermined time range by a sliding time range that slides with one timestep shift.

After a (first) time step, the time range may be shifted by one time step in the direction of a later time. Those measurement values of the previous time range already fed into the recurrent neural network do not need to again input into the recurrent neural network. Only the additional measurement value, being the previous next point in time or the measurement value pertaining to the previous next point in time may additionally be fed in. Only the measurement value corresponding to the measurement value of the previous next point in time need to be additionally fed into the recurrent neural network. Thereby, data transmission rate may be reduced. Furthermore, the frequency may continuously be predicted.

According to an embodiment of the present invention, the recurrent neural network has previously been trained with training data, the training data comprising plural wind park measurement values and plural utility grid measurement values, when the frequency has a normal frequency value: plural other wind park measurement values and plural other the utility grid measurement values, when the frequency has an underfrequency value: plural still other wind park measurement values and plural still other the utility grid measurement values, when the frequency has an overfrequency value.

The training data are utilized in order to set up plural values for plural parameters of the recurrent neural network. The plural parameter values of the recurrent neural network may define, how the frequency value as output by the neural network is calculated from the plural input values. The neural network parameters may comprise for example weighting parameters, defining weights and/or biases (offsets) for the plural different inputs and also weights and/or biases of one or more intermediate layers or intermediate nodes. These weighting parameters may be derived during the neural network training using the training data.

Primarily, the training data may comprise the plural wind park measurement values and the plural utility grid measurement values, when the frequency has a normal frequency value, since this is the normal situation for the utility grid. A smaller number of respective measurement values may be available for the case of an underfrequency event or overfrequency event. However, this may be compensated by applying appropriate weights for those measurement values pertaining to an underfrequency event and/or overfrequency event.

According to an embodiment of the present invention, for the training, the plural other wind park measurement values and the plural other the utility grid measurement values, when the frequency has an underfrequency value, are weighted with another weight, in particular between 5 and 15, that is higher than a weight used for the plural wind park measurement values and plural the utility grid measurement values, when the frequency has a normal frequency value, the other weight being in particular determined in dependence on the number of the other measurement values.

According to an embodiment of the present invention, for the training, the plural still other wind park measurement values and the plural still other the utility grid measurement values, when the frequency has an overfrequency value, are weighted with still another weight, in particular between 30 and 50, that is higher than a weight used for the plural wind park measurement values and plural the utility grid measurement values, when the frequency has a normal frequency value, the still other weight being in particular determined in dependence on the number of the still other measurement values.

When the measurement values pertaining to the underfrequency events or/and overfrequency events are applied another weight and a still another weight, respectively, which is higher than the weight of the measurement values for the normal frequency situation, the method may be improved, leading to an improvement of the accuracy of the prediction of the grid frequency.

According to an embodiment of the present invention, the recurrent neural network is implemented as a long short-term memory (LSTM) network. The long short-term memory (LSTM) is an artificial recurrent neural network (RNN) architecture used in the field of deep learning, conventionally. The LSTM has feedback connections unlike standard feedforward neural networks. The LSTM can process entire frequencies of data, such as the time series of the measurement values of the grid parameters and/or wind park power parameters. A common LSTM unit is composed of a cell, an input gate, an output gate and a forget gate. The cell may remember values over arbitrary time intervals and the three gates may regulate the flow of information into and out of the cell. The LSTM networks may be well suited to classifying, processing and making predictions based on time series data, as represented by the measurement values of the grid parameters and/or wind park power parameters.

According to an embodiment of the present invention, by feeding the plural utility grid measurement values and the plural wind park measurement values into the recurrent neural network, the frequency values at plural subsequent next points in time are output, the plural subsequent next points in particular covering between 1 s and 15 s. Thereby, predictions for several points in time in the future are enabled. Thereby, operating the utility grid and/or the wind park may potentially be improved.

According to an embodiment of the present invention, the method further comprises employing plural recurrent networks, each being trained to output, upon feeding in the plural the utility grid measurement values and the plural wind park measurement values, the frequency value at a particular one of plural subsequent next points in time.

For each point in time (in the future, i.e., after the present point in time) for which the frequency value of the grids is to be determined or predicted, a respective recurrent network may be employed. A first recurrent network may be employed. A first recurrent network may therefore predict, from the first previous points in time up to the first present point in time or from the measurement values relating to the first previous points in time and up to the first present point in time, the respective frequency value of the grid at the first next point in time. A second recurrent network may be employed which, depending on the measurement values relating to the plural second previous points in time up to the second present point in time (being equal to the first next point in time), the frequency value at the second next point in time (being equal to the second time step after the first present point in time). This applies in analogy to each further recurrent network outputting to a third, a fourth, a fifth and an nth point in time after the (first) present point in time and outputting thereby the respective grid frequency prediction. Thereby, prediction accuracy may be improved compared to the situation, where only a single recurrent network is utilized.

It should be understood, that features, individually or in any combination, disclosed, described, explained or provided for a method of predicting a frequency value of a utility grid to which a wind park is connected, may also, individually or in any combination, apply to a corresponding arrangement for predicting a frequency value of a utility grid to which a wind park is connected, according to embodiments of the present invention and vice versa.

According to an embodiment of the present invention it is provided an arrangement for predicting a frequency value of a utility grid to which a wind park is connected, the arrangement comprising an input module adapted to receive: plural utility grid measurement values pertaining to a pre-determined time range before and until a present point in time; and plural wind park measurement values pertaining to the time range: a recurrent neural network trained to output the frequency value at at least one next point in time upon feeding in the plural utility grid measurement values and the plural wind park measurement values.

The arrangement may be implemented in software and/or hardware. The arrangement may for example be comprised in a wind park controller or a utility grid operator equipment.

According to an embodiment of the present invention it is provided a wind park, comprising plural wind turbines connected to a utility grid: a wind park measurement station: a utility grid measurement station; and an arrangement according to the preceding embodiment communicatively connected to the wind turbines, to the measurement station and to the utility grid measurement station.

The aspects defined above, and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with references to the following Figures, wherein like designations denote like members, wherein.

DETAILED DESCRIPTION

Embodiments of the present invention use a machine learning model, namely a recurrent neural network, to predict the grid frequency and also to predict a possible frequency deviation from a nominal grid frequency.

Figure 4:
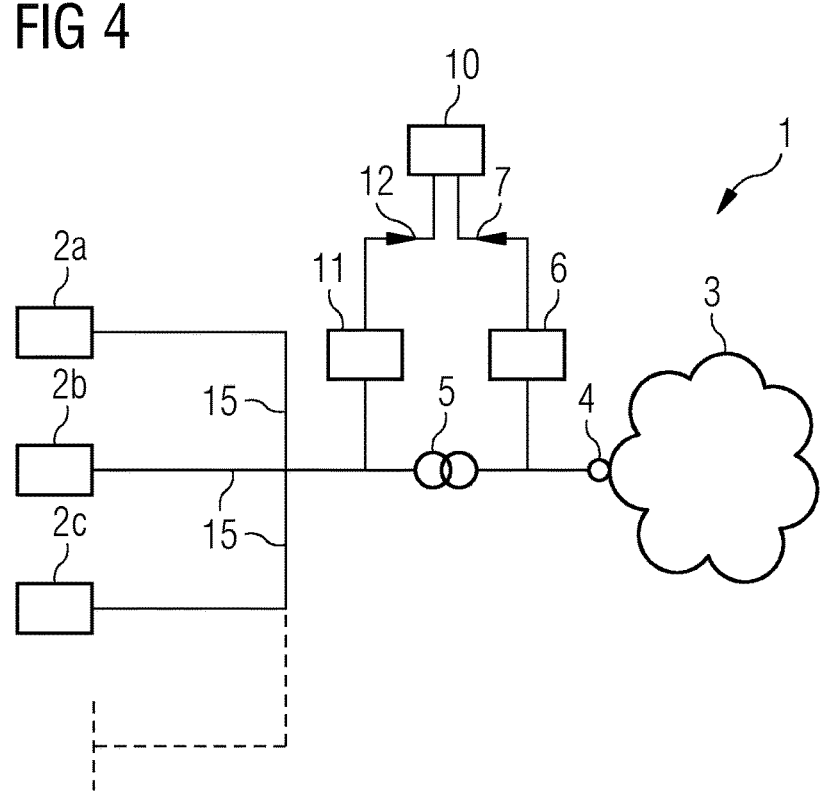
FIG. 4 schematically illustrates a wind park according to an embodiment of the present invention, including an arrangement for predicting a frequency value according to an embodiment of the present invention.

One embodiment of a wind park 1 is schematically illustrated in FIG. 4. The wind park comprises plural wind turbines 2a, 2b, 2c which are connected to a utility grid 3. In the present embodiment, the wind turbines 2a, 2b, 2c, . . . , 2n are connected to a common electrical conductor 15 (e.g., busbar) which is connected, via a wind park transformer 5, to the point of common coupling 4 which is connected to the utility grid 3.

The wind park 1 comprises a utility grid measurement station 6 which is adapted to acquire plural utility grid measurement values 7 which pertain to a particular time range. The wind park 1 further comprises an arrangement 10 according to an embodiment of the present invention for predicting a frequency value of the utility grid 3. The wind park further comprises a wind park measurement station 11 which is adapted to acquire wind park measurement values (in particular wind park power measurement values) 12 which pertain to a particular time range.

The plural utility grid measurement values 7 as well as the plural wind park measurement values 12 are supplied to a respective input module of the arrangement 10. The arrangement 10 comprises or has implemented a recurrent neural network which receives the measurement values 7, 12 as input values. The recurrent neural network then predicts from the measurement values pertaining to the particular time range, the frequency value of the utility grid 3 at at least one next point in time.

Thus, the recurrent neural network model may in particular embodiments have the following input and output values:

As model input, the values of the frequency and the measurements from the wind farm (for example active power, reactive power, voltage) during a certain time period (input window) until the present time. The model input may also be extended with measurements from other nodes in the electrical network 3, in order to further improve the accuracy of the model. Input window size defined by the number of timestamps in the input window may be subject to an optimization.

The model output may include the value of the frequency of the grid in the next timestamp or in several timestamps after the input window. Depending on the output value or frequency, the prediction result may be classified as normal frequency, underfrequency or overfrequency event.

The next-timestamp prediction presented here may be the simplest approach of the predictions. Prediction horizon may be extended to several timestamps, although the model accuracy is expected to be the best for the next-timestamp prediction.

The data used for the model training and evaluation may have granularity of 1 s, i.e., each second, a measurement value may be acquired and utilized for training. A sample for the model input may be selected using all timestamps with the frequency in the normal range. As a result of this selection, only data in the normal frequency range or just before frequency deviation events occur, may be used.

Sliding windows of the input window size may be created with one-timestamp sliding shift. One requirement may be applied for the sliding windows in that the data should be continuous (no difference larger than several seconds between two sequent timestamps). This may guarantee that there are no large gaps between timestamps in the input windows.

The number of timestamps in the input window may be chosen to be between 40 and 70, for example 60, but may also be subject to optimization. The value of 60 may correspond to one minute of data taking and processing. For the model output, frequency values during the next timestamps after the input sliding windows are selected. The output may contain normal frequency values, underfrequency values or overfrequency values.

According to an embodiment of the present invention, a network architecture that takes time dependence into account is utilized as an implementation of the recurrent network. In particular, the long short-term memory (LSTM) architecture described in Sepp Hochreiter; Jürgen Schmidhuber (1997). "Long short-term memory". Neural Computation. 9 (8): 1735-1780, may be used according to embodiments of the present invention for frequency predictions. For the model training, the tensor flow framework with the Keras application interface may be utilized.

In a normal operation of a utility grid, frequency deviation events may be rare, orthe frequency prediction model may learn mostly the behaviour in the normal frequency range. In order to allow the model to learn better the frequency behaviour just before the deviation states, weights may be introduced for deviation-related data samples. A possibility to train models with weights available in Keras may be implemented. For data samples with underfrequency values, weights equal to 10 may be used, whereas for data samples with overfrequency values, weights may be set to 40 to account for more seldom overfrequency events. Selection of weights may be subject to optimization.

Figure 1:
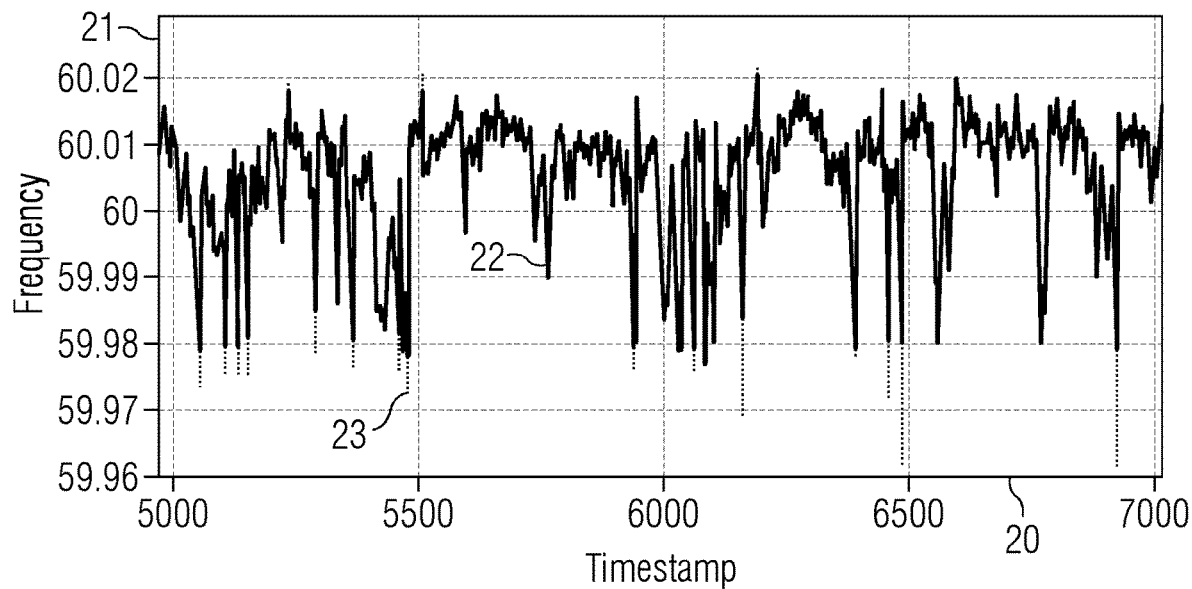
FIG. 1 depicts prediction values of a grid frequency as obtained according to embodiments of the present invention.
Figure 2:
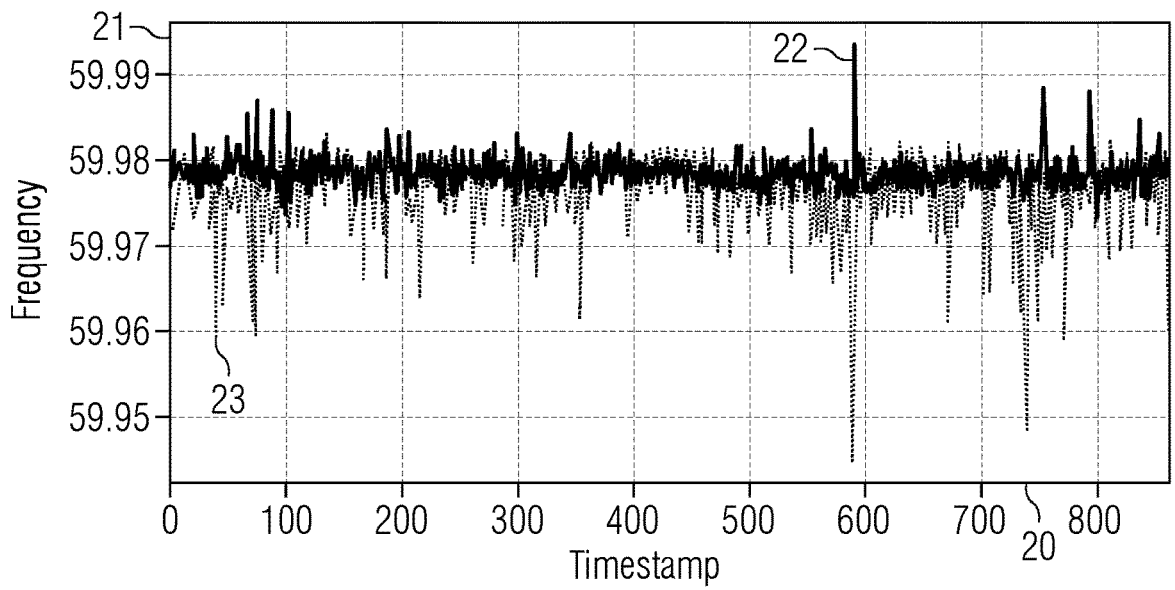
FIG. 2 depicts prediction values of a grid frequency as obtained according to embodiments of the present invention.
Figure 3:
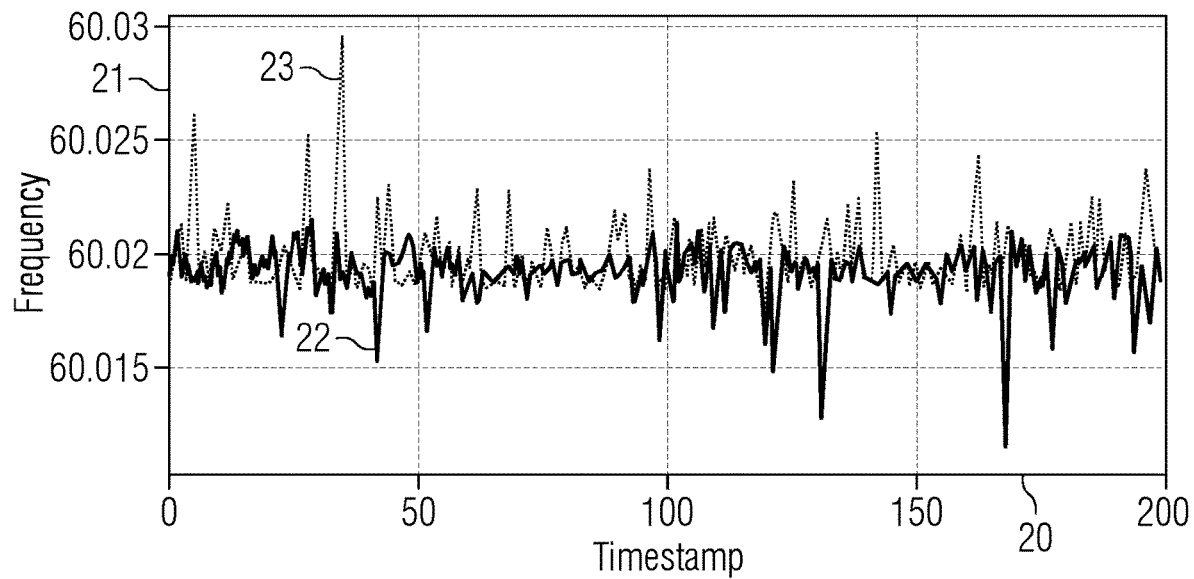
FIG. 3 depicts prediction values of a grid frequency as obtained according to embodiments of the present invention.

FIGS. 1, 2 and 3 depict in graphs having as an abscissa 20 indicating the timestamp and having as an ordinate 21 indicating the frequency value, some examples of frequency predictions in comparison with the true values. Thereby, for all graphs, an independent data set is utilized. Thereby, a comparison between frequency predictions (solid lines 22) and measurements (dashed lines 23) are presented in FIG. 1 for all frequencies, in FIG. 2 for low frequency events and in FIG. 3 for high frequency events, thus in FIGS. 2, 3 only for timestamps where the frequency was respectively below or above the normal frequency range.

As can be appreciated from FIGS. 1, 2, 3, the predictions (curves 22) closely match with the measured values (curves 23), indicating a good performance and accuracy of the predictions.

The accuracy of the model predictions may allow the classification of the predicted frequency to three classes: normal-frequency states, underfrequency deviation events and overfrequency deviation events. In the following tables 1 and 2, the numerical results of the classifications are presented (TP: true positives; FN: false negatives; FP: false positives; TN: true negatives).

TABLE 1

Confusion matrix for underfrequency event predictions

|  | Underfrequency event | no event |
|---|---|---|
| underfrequency predicted | TP: 96.53% | FP: 1.74% |
| no event predicted | FN: 3.47% | TN: 97.42% |

TABLE 2

Confusion matrix for overfrequency event predictions

|  | Overfrequency event | no event |
|---|---|---|
| overfrequency predicted | TP: 87.62% | FP: 0.85% |
| no event predicted | FN: 12.38% | TN: 97.42% |

The model demonstrates a high true positive and low false positive rate in the frequency event classification. The use of different weights may allow further optimizations of the model performance depending on possible requirements on the numbers of true positives and false positives.

Embodiments of the present invention may provide a prediction model which considers as input both the grid frequency and measurements from the wind park such as the active power. Time dependence of the model input may be considered for the frequency predictions. The grid frequency and the wind farm data may be combined in order to provide input for the neural network model. The use of combined information may allow to improve accuracy of the frequency predictions. The neural network model uses time dependence, namely the long short-term memory neural network (LSTM) model intrinsically takes into account time dependency of the grid frequency and wind park data according to embodiments of the present invention.

Precise prediction of the frequency and frequency deviations may be used for example in a wind park control algorithm or power plant operational planning in order to improve control of the wind park and/or the utility grid.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of predicting a frequency value of a utility grid to which a wind park is connected and controlling operation of the utility grid and/or the wind park, the method comprising:
    obtaining plural utility grid measurement values pertaining to a predetermined time range before and until a present point in time;
    obtaining plural wind park measurement values pertaining to the predetermined time range;
    feeding the plural utility grid measurement values and the plural wind park measurement values into a recurrent neural network trained to output a predicted frequency value at at least one next point in time, the next point in time being between 0.5 s and 2 s after the present point in time, wherein the plural utility grid measurement values contain a, across the time range, time series of values of the grid frequency as measured at one or more locations and/or a grid voltage as measured at the one or more locations; and
    controlling operation of the utility grid and/or the wind park using the predicted frequency value.

2. The method according to claim 1, wherein the grid voltage is measured at wind park grid connection node.

3. The method according to claim 1, wherein the plural wind park measurement values contain a, across the time range, time series of values of at least one of:
    an active output power of the wind park;
    a reactive output power of the wind park.

4. The method according to claim 1, further comprising:
    classifying the output frequency value from the recurrent neural network as at least one of:
    a normal frequency value, if the predicted frequency value is within a predetermined frequency range;
    an underfrequency value, if the predicted frequency value is below the predetermined frequency range or below a low frequency threshold value;
    an over frequency value, if the predicted frequency value is above the predetermined frequency range or above a high frequency threshold value.

5. The method according to claim 1,
    wherein the time range amounts to between 30 s and 200 s, and/or wherein a number of measurement values across the time range is between 30 and 200, and/or wherein a time step is between 0.5 s and 2 s.

6. The method according to claim 1, wherein the method is continuously performed by implementing the predetermined time range by a sliding time range that slides with one timestep shift.

7. The method according to claim 1, wherein the recurrent neural network has previously been trained with training data, the training data comprising:
   previous plural wind park measurement values and previous plural utility grid measurement values, when the frequency has a normal frequency value;
   plural other wind park measurement values and plural other the utility grid measurement values, when the frequency has an underfrequency value;
   plural still other wind park measurement values and plural still other the utility grid measurement values when the frequency has an overfrequency value.

8. The method according to claim 7, wherein, for the training, the plural other wind park measurement values and the plural other utility grid measurement values, when the frequency has the underfrequency value, are weighted with another weight, between 5 and 15, that is higher than a weight used for the plural wind park measurement values and the plural utility grid measurement values, when the frequency has normal frequency value, the other weight being determined in dependence on the number of the other measurement values.

9. The method according to claim 1, wherein, for the training, the plural still other wind park measurement values and the plural still other the utility grid measurement values, when the frequency has an overfrequency value, are weighted with still another weight, between 30 and 50, that is higher than a weight used for the plural wind park measurement values and plural the utility grid measurement values, when the frequency has a normal frequency value, the still other weight being determined in dependence on the number of the still other measurement values.

10. The method according to claim 1, wherein the recurrent neural network is implemented as a long short-term memory network.

11. The method according to claim 1, wherein by feeding the plural utility grid measurement values and the plural wind park measurement values into the recurrent neural network, the frequency values at plural subsequent next points in time are output, the plural subsequent next points covering between 1 s and 15 s.

12. The method according to claim 1, further comprising:
   employing plural recurrent networks, each being trained to output, upon feeding in the plural the utility grid measurement values and the plural wind park measurement values, the frequency value at a particular one of plural subsequent next points in time.

13. An arrangement for predicting a frequency value of a utility grid to which a wind park is connected and controlling the utility grid and/or the wind park, the arrangement comprising:
   an input module configured to receive:
      plural utility grid measurement values pertaining to a predetermined time range before and until a present point in time; and
      plural wind park measurement values pertaining to the predetermined time range;
   a recurrent neural network trained to output a predicted frequency value at at least one next point in time upon feeding in the plural utility grid measurement values and the plural wind park measurement values,
   wherein the plural utility grid measurement values contain a, across the time range, time series of values of a grid frequency as measured at one or more locations and/or a grid voltage as measured at one or more locations; and
   a wind park controller and/or a utility grid controller.

14. A wind park, comprising:
   plural wind turbines connected to a utility grid;
   a wind park measurement station;
   a utility grid measurement station; and
   an arrangement according to claim 13 communicatively connected to the wind turbines, to the wind park measurement station and to the utility grid measurement station.

* * * * *